United States Patent Office 3,472,095
Patented Oct. 14, 1969

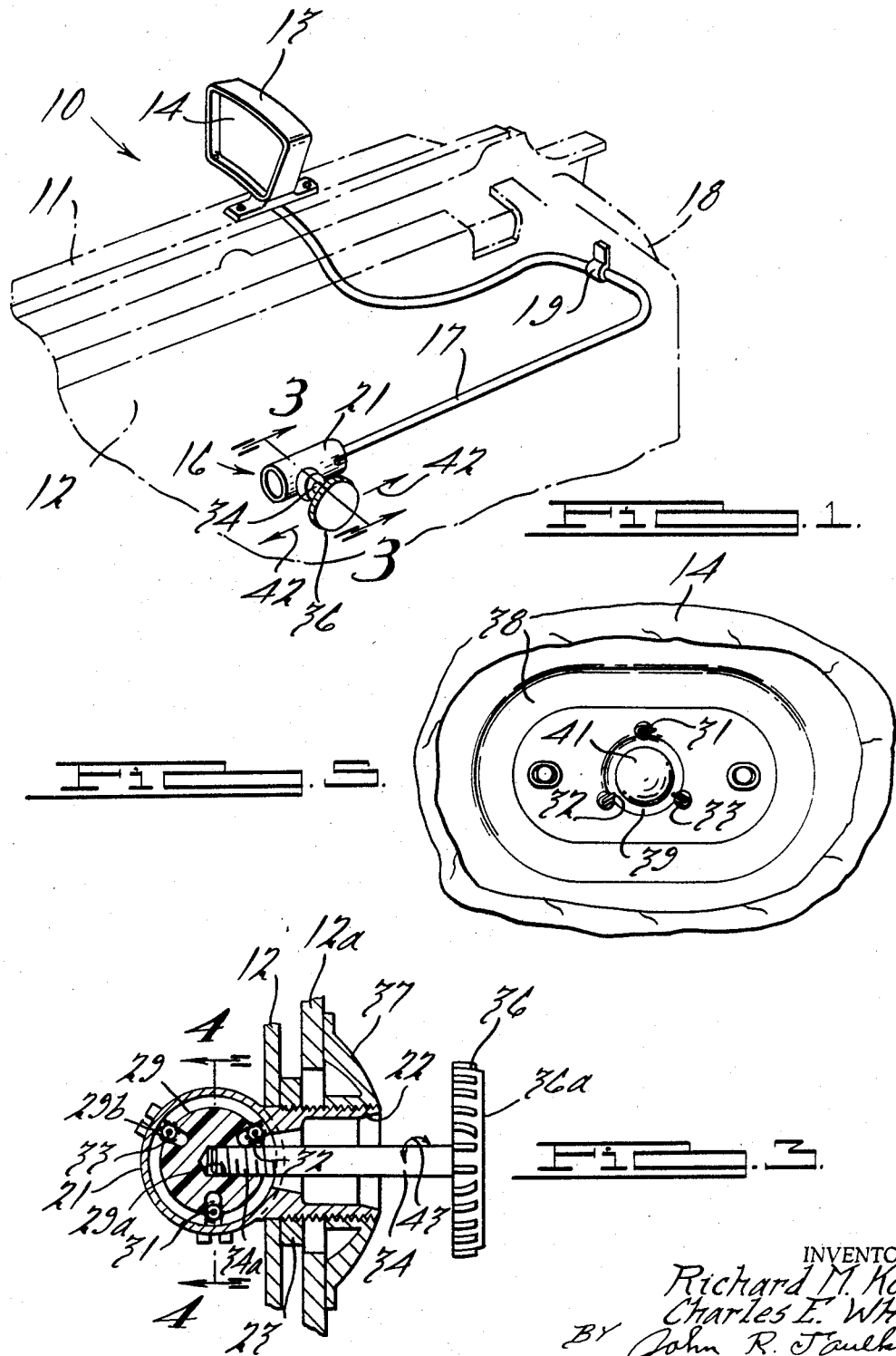

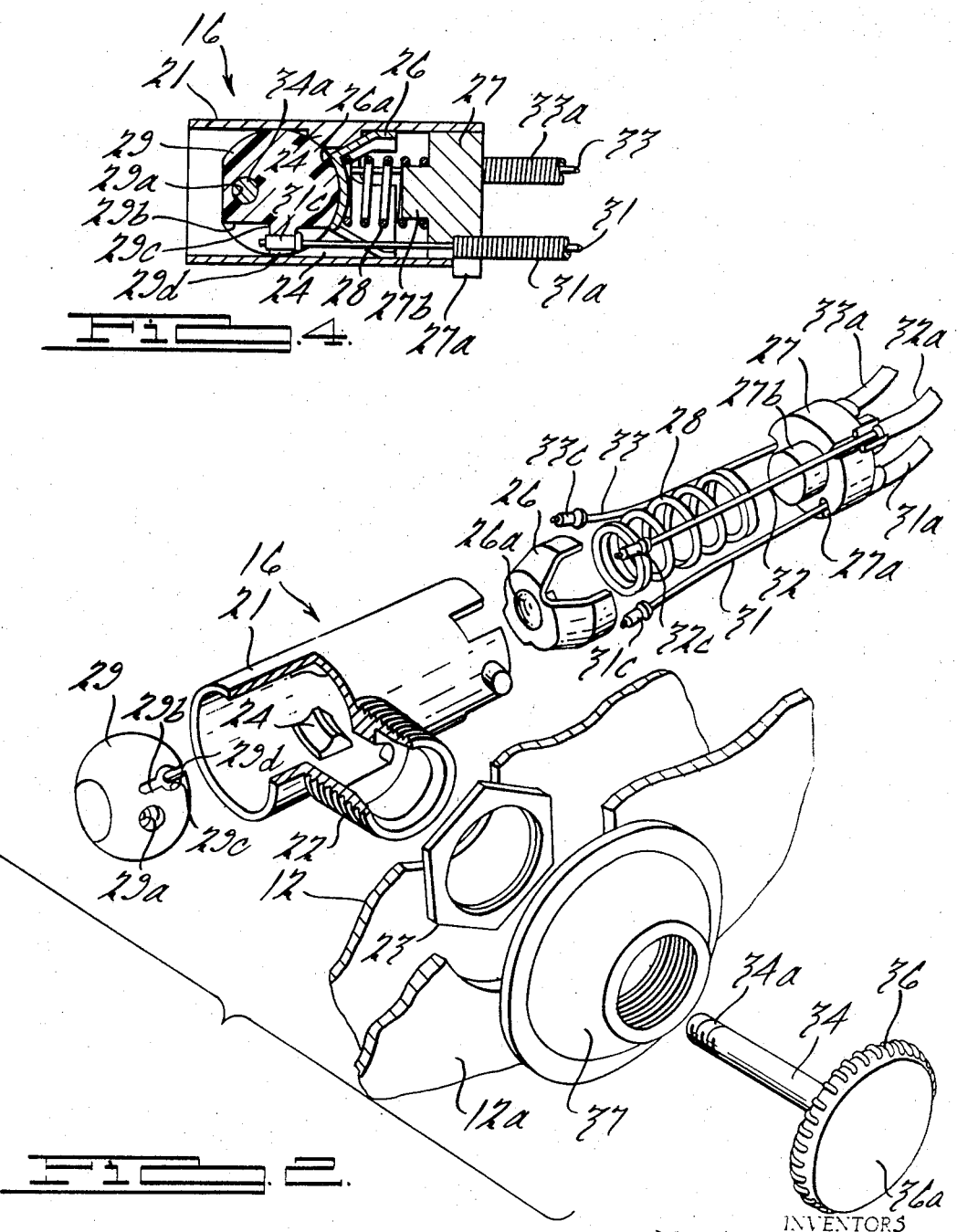

3,472,095
REMOTE CONTROL REARVIEW
MIRROR ASSEMBLY
Richard M. Kostin, Dearborn, and Charles E. White, Allen Park, Mich., assignors to Ford Motor Company, Dearborn, Mich., a corporation of Delaware
Filed June 30, 1967, Ser. No. 650,270
Int. Cl. F16c 1/12
U.S. Cl. 74—501                                3 Claims

ABSTRACT OF THE DISCLOSURE

A control assembly for a rearview mirror movably mounted on the exterior of a vehicle door. The assembly includes a substantially spherical member which is secured to the door and is universally rotatable and connected by wires to the mirror. A manually operable control stem is secured to the spherical member and extends into the vehicle passenger compartment at right angles to the plane of the door.

BACKGROUND OF THE INVENTION

Recent passenger vehicle designs include the elimination of front door vent windows. Outside rearview mirror control wires, formally routed through the door panel cavity beneath the vent windows, necessarily must be routed along the outside periphery of the door since vertical window movement in such design occurs throughout the entire door cavity. In order to minimize the length of wire needed, these wires may be routed around the leading edge of the vehicle door. It is known, however, that Bowden wires, conventionally used as outside rearview mirror control elements, have deleterious lost motion or "play" proportional to the number of bends in such wires. Thus, it is desirable that the orientation of the Bowden wires proximate the manually operable control means mounted on the inside door panel be substantially parallel to this panel so that a straight length of wire will reach the door leading edge, thereby reducing the number of bends in the wire and corresponding lost motion.

Also, current vehicle design practice indicates the desirability of eliminating elements of relatively small cross section having extensive protrusion into the passenger compartment area. Manually operable control stems of rearview mirror control assemblies often have such protrusions.

This invention provides a rearview mirron control system of simple design and reliability of operation wherein the Bowden wires included are oriented substantially parallel to the door inner panel from their operable attachment to a manually motivated member to the door leading edge. The manually motivated member protrudes only a short distance into the passenger compartment and has a relatively large cross section including a flat surface facing the passenger compartment. The manually motivated member may be rotated or swung along a plane perpendicular to the plane of the door inner panel for mirror adjustment.

BRIEF SUMMARY OF THE INVENTION

A rearview mirror control assembly constructed in accordance with this invention is adapted for utilization in combination with a motor vehicle body structure partially defining a passenger compartment and having an outer surface and an inner surface. A rearview mirror is connected for pivotal movement to the body structure outer surface. A mirror control device is secured to the body structure adjacent the inner surface and includes a housing and arcuate means, at least partially surrounded by said housing, capable of universal rotational movement. Control wires operatively connect the arcuate means and the mirror thereby transmitting movement of the arcuate means to the mirror. The control wires extend substantially parallel to the inner surface of the body structure adjacent their connection to the arcuate member. A manually operable, elongate, mirror adjustment member is secured to the arcuate means for movement therewith and extends into the passenger compartment at right angles to the inner surface of the body structure. Mirror adjustment may be accomplished by rotating the adjustment member about its longitudinal axis or by pivotally moving the adjustment member in a plane extending substantially perpendicular to the plane of the inner surface, or a combination of these two movements.

BRIEF DESCRIPTION OF THE DRAWINGS

FIGURE 1 is an isometric view of a portion of a motor vehicle door structure including a rearview mirror control assembly constructed in accordance with this invention;

FIGURE 2 is an exploded view of the rearview mirror control assembly of FIGURE 1;

FIGURE 3 is a sectional view taken along the line 3—3 of FIGURE 1;

FIGURE 4 is a sectional view taken along the line 4—4 of FIGURE 3; and

FIGURE 5 is a front view of the rearview mirror illustrated in FIGURE 1 having a portion of the reflective element broken away to illustrate the mirror mounting structure and control wire attachment.

DETAILED DESCRIPTION OF THE INVENTION

Referring now in detail to the drawings, with particular reference to FIGURE 1, the numeral 10 denotes a vehicle door having an outer panel 11 and an inner panel 12 spaced from the outer panel in the conventional manner to define a door interior cavity. Inner panel 12 is spaced from a decorative trim panel 12a. A rearview mirror housing 13 is secured to outer panel 11 and pivotally mounts a reflective mirror element 14. A rearview mirror control unit 16 is secured to inner panel 12 as will be discussed in detail below and is interconnected with reflective element 14 by means of a composite control cable 17 that extends from control unit 16 substantially parallel to inner panel 12, to door leading edge 18 where it is secured by a clamp 19. It is to be understood that control cable 17 is a composite cable including a plurality of individual actuating elements such as Bowden wires.

As may be seen from FIGURES 2, 3 and 4, control unit 16 includes a cylindrical, sleeve-like housing 21 having an integrally formed, transversely extending threaded sleeve 22 projecting therefrom. Sleeve 22 extends through an opening in inner panel 12 into the vehicle passenger compartment and is secured to inner panel 12 by a jam nut 23. The interior surface of housing 21 has formed thereon a plurality of inclined projections 24, best seen in FIGURES 2 and 4. The inclined sides of these projections are curved in order to best cooperate with other elements of control unit 16 as will be discussed in detail below.

A spring retaining member 26, having a generally U-shaped cross section and a concave end portion 26a is positioned within housing 21 and bears against one slope of each projection 24. A generally cylindrical anchor member 27 is received within housing 21 in spaced apart relationship from retaining member 26. Anchor member 27 has three equally spaced cut-away portions 27a and a cylindrical projection 27b extending toward retaining member 26. A coil spring 28 is positioned about anchor projection 27b and confined in housing 21 between retaining member 26 and anchor member 27 in a state of compression.

An arcuate member 29, having a substantially spherical shape, is positioned within housing 21 on the side of projections 24 remote from retaining member 26. Arcuate member 29 bears against the curved surface of projections 24 and the concave end portion 26a of retaining member 26 so as to be capable of universal rotational motion within housing 21. Arcuate member 29 is formed with a tapped hole 29a and three equally spaced cut-away portions 29b. These cut-away portions 29b partially define shoulders 29c having slots 29d extending therethrough.

Arcuate member 29 is operatively connected to reflective mirror element 14 by three Bowden wires including wires 31, 32 and 33 surrounded along a portion of their lengths by sheaths 31a, 32a and 33a, respectively. Adjacent control unit 16, these sheaths terminate at anchor member 27 and bear against the end walls of cut-away portions 27a of anchor member 27. Wires 31, 32 and 33 continue along the length of the internal cavity of housing 21 and terminate in enlarged portions 31c, 32c and 33c respectively that are secured within slots 29d of shoulders 29c of arcuate member 29.

When assembled, the space between retaining member 26 and anchor 27 is less than the "at rest" length of spring 28, so that spring 28 is in a state of compression. Retaining member 26 is held in place by projections 24, and anchor member 27 is held in place against the force of spring 28 by wire sheaths 31a, 32a and 33a, that bear against the end walls of cut-away portions 27a of the anchor member. It readily may be appreciated that this arrangement of parts provides that the arcuate member 29 is held securely against projections 24 and concave portion 26a of retaining member 26 by wires 31, 32 and 33, while being capable of limited universal rotational movement.

Rotational movement of arcuate member 29 is due to the manual manipulation of an operating member including a stem 34 having a threaded end portion 34a that is received in tapped hole 29a of member 29. Stem 34 extends through threaded sleeve 22 of housing 21, door inner panel 12, jam nut 23, trim panel 12a and a decorative retaining nut 37 located within the passenger compartment and threaded on sleeve 22. The end of stem 34 remote from arcuate member 29 has formed thereon an integral knob 36 having a relatively large cross section and a large, flat, passenger compartment facing surface 36a.

Referring now to FIGURE 5, the numeral 38 denotes a reflective element backing plate to which reflective element 14 is secured. Backing plate 38 has formed thereon a socket portion 39 that cooperates with a ball 41 extending from mirror housing 13. This ball and socket connection allows pivotal movement of backing plate 38 and reflective element 14 relative to housing 13. Control wires 31, 32 and 33 are secured to backing plate 38 by brazing or other suitable joining methods, in an equally spaced circular pattern corresponding to the pattern of attachment of the other ends of these wires to arcuate member 29, best seen in FIGURE 3. That is, the ends of wires 31, 32 and 33 are attached to both arcuate member 29 and reflective element backing plate 38 in an equally spaced circular pattern 120 degrees apart so that a rotational movement of arcuate member 29 causes a following movement of reflective element 14, the latter being secured to backing plate 38.

Adjustment of reflective element 14 to any desired viewing position is accomplished by manual manipulation of stem 34 by a vehicle operator grasping knob 36. Knob 36 may be moved fore and aft as illustrated by arrows 42 in FIGURE 1 so that stem 34 moves along a plane substantially normal to the plane of door inner panel 12, or knob 36 may be rotated causing a rotation of stem 34 about its longitudinal axis as illustrated by the arrows 43 of FIGURE 3, or a combination of these movements may be accomplished by the vehicle operator in order to obtain the desired mirror position.

This invention thus provides a remote control rearview mirror assembly in which the remote control unit is interconnected with the pivotally mounted rearview mirror by composite control cables including a plurality of Bowden cables that extend from the control unit to the leading edge of the vehicle door in a path substantially parallel to the door inner panel. The manually operable motivating member extends only a short distance into the vehicle passenger compartment and terminates therein in a knob having a relatively large cross sectional area and a flat, passenger compartment facing surface.

It is to be understood that this device is not limited to the exact construction illustrated and described above, but that various changes and modifications may be made without departing from the spirit and scope of invention as defined by the following claims.

We claim:

1. In a motor vehicle, a body structure partially defining a vehicle passenger compartment and having an outer surface and an inner surface, a mirror housing secured to said outer surface, a mirror pivotally connected to said housing, a mirror control device secured to said structure adjacent said inner surface and including a housing, arcuate means at least partially surrounded by said housing and capable of universal rotational movement, elongate control means operatively connected to said arcuate means and said mirror and transmitting movement of said arcuate means to said mirror, said control means extending substantially parallel to said inner surface adjacent said device, and manually operable elongate mirror adjustment means secured to said arcuate means for movement therewith, extending from said arcuate means and into said passenger compartment at right angles to said inner surface and capable of being rotated about its own longitudinal axis, whereby the position of said mirror may be adjusted by swinging said adjustment means about a point located within the confines of said arcuate means and rotating said adjustment means about its own axis.

2. The combination of claim 1, wherein said body structure comprises a door having an outer panel and an inner panel spaced from said outer panel, said panels defining a door cavity therebetween, said control means comprising a plurality of wires extending within said cavity from said arcuate means to the leading edge of said door substantially parallel to said inner panel.

3. The combination of claim 2, wherein said adjustment means includes a stem secured at one end to said arcuate means and having a knob positioned in said passenger compartment on the other end thereof.

References Cited

UNITED STATES PATENTS

| 627,671 | 6/1899 | Kelly | 74—18.1 X |
|---|---|---|---|
| 1,630,217 | 5/1927 | Rasor | 74—501 X |
| 2,144,616 | 1/1939 | Carlson. | |
| 1,992,828 | 2/1935 | Hodny et al. | 248—483 |
| 3,195,370 | 7/1965 | Smith | 74—501 |
| 3,251,238 | 5/1966 | Fuqua | 74—501 |

FRED C. MATTERN, Jr., Primary Examiner

C. F. GREEN, Assistant Examiner